(12) United States Patent
Kidd, III

(10) Patent No.: US 6,464,178 B1
(45) Date of Patent: Oct. 15, 2002

(54) HOSE GUIDE

(76) Inventor: Odis Q. Kidd, III, 2322 Mecca Rd., Columbus, OH (US) 43234

( * ) Notice: Subject to any disclaimer, the term of this patent is extended or adjusted under 35 U.S.C. 154(b) by 0 days.

(21) Appl. No.: 09/612,152

(22) Filed: Jul. 7, 2000

(51) Int. Cl.[7] .................................................. F16L 3/00
(52) U.S. Cl. ........................................................ 248/51
(58) Field of Search ............................... 248/51, 68, 65, 248/74.2, 75, 79, 76, 89; 242/615.3, 615.4

(56) References Cited

U.S. PATENT DOCUMENTS

| | | | | |
|---|---|---|---|---|
| 955,260 A | * | 4/1910 | Getman | |
| 955,342 A | * | 4/1910 | Maxwell | |
| 1,414,834 A | * | 5/1922 | Souter | 248/51 |
| 1,445,475 A | * | 2/1923 | Berlow | |
| 1,686,115 A | * | 10/1928 | Anderson | 248/51 |
| 2,464,958 A | * | 3/1949 | Allen | 248/51 |
| 2,858,590 A | * | 11/1958 | Koch | |
| 3,165,286 A | * | 1/1965 | Johnson et al. | 248/75 |
| 3,409,257 A | * | 11/1968 | Elm | 248/65 |
| 3,491,971 A | * | 1/1970 | Fisher | 248/65 |
| 3,853,148 A | * | 12/1974 | de Vincent et al. | 248/62 |
| 3,897,923 A | * | 8/1975 | Paepke et al. | 248/75 |
| 3,941,412 A | * | 3/1976 | Carpenter | 248/75 |
| 4,433,821 A | * | 2/1984 | Bolding et al. | 248/65 |
| 4,436,267 A | * | 3/1984 | Eads et al. | 248/75 |
| 4,537,437 A | * | 8/1985 | Buccola | 248/75 |
| 4,586,676 A | | 5/1986 | Johnston et al. | |
| 4,895,225 A | | 1/1990 | Parnell | |
| 5,427,339 A | * | 6/1995 | Pauli et al. | 248/75 |
| 5,549,262 A | | 8/1996 | Whitehead | |
| 5,634,615 A | * | 6/1997 | Shuen | 248/75 |
| 5,738,313 A | * | 4/1998 | Rinke | 248/74.2 |
| 5,853,142 A | | 12/1998 | Anderson | |
| 5,881,474 A | * | 3/1999 | Berger | 248/75 |
| 5,988,570 A | * | 11/1999 | Gretz | 248/74.2 |
| 6,003,819 A | * | 12/1999 | Hall | 248/75 |
| 9,059,215 | * | 5/2000 | Finnis | 248/75 |
| 6,079,675 A | * | 6/2000 | Hsu | 248/75 |

* cited by examiner

Primary Examiner—Daniel P. Stodola
Assistant Examiner—Jennifer E. Novosad
(74) Attorney, Agent, or Firm—David A. Greenlee

(57) ABSTRACT

A preferably unitary plastic hose guide for guiding a hose is mounted on a building above the ground so that a hose is lifted high enough to avoid contact with obstacles located on the ground adjacent a building while being deployed and used. In one embodiment, an elongated guide member has a J-shaped curved trough for retaining a hose placed in it. The trough has downwardly curved entrance and exit lips to facilitate hose movement into and out of the trough. The lip of the J-shape retains the hose in the trough by preventing the weight of the hose from dragging the hose outwardly and downwardly out of the trough, while readily permitting lifting of the hose out of the trough when desired. A mounting bracket spaces the guide member from the building where it is removably secured by headed fasteners. In another embodiment, the unitary plastic guide has a semi-circular trough with a generally C-shaped cross section to direct the hose around a corner of the building. The hose is retained by one protrusion extending upwardly from the extended lower lip of the C-shape to retain the hose within the trough during hose movement. Headed fasteners on the building cooperate with keyhole-shaped slots to removably mount the hose guide on the corner of the building.

6 Claims, 3 Drawing Sheets

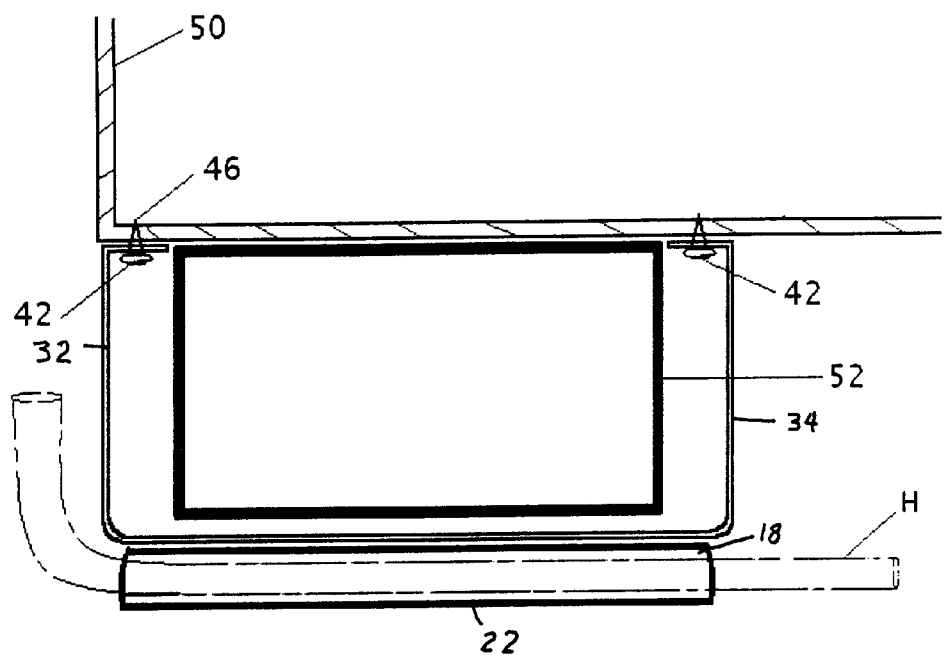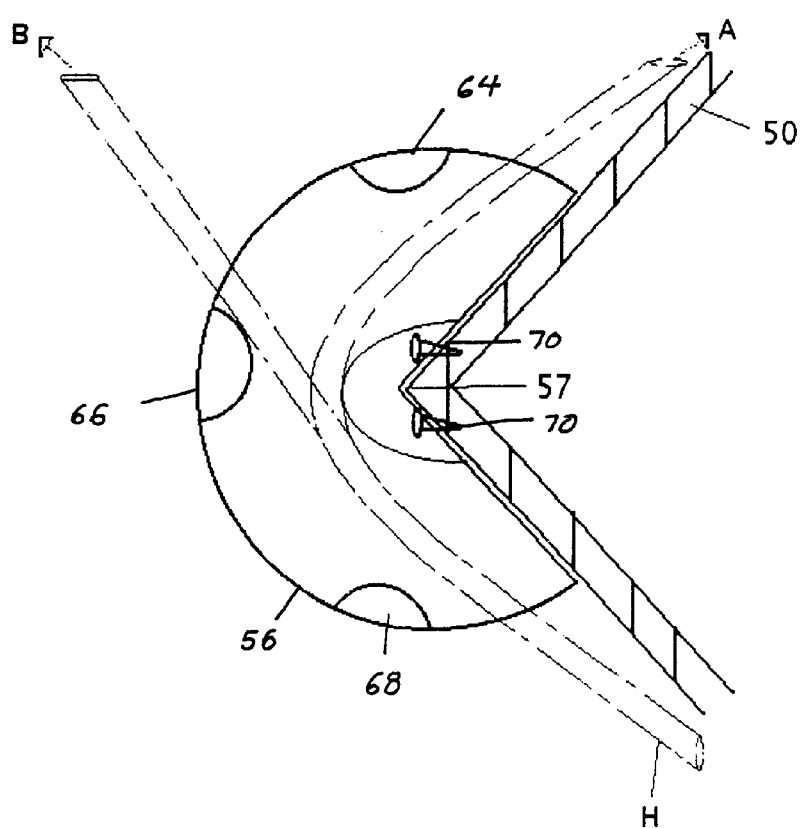

HOSE GUIDE

BACKGROUND OF THE INVENTION

1. Technical Field

This invention relates to guides for water hoses and, more particularly, to such a guide mounted on a house.

2. Background Art

Most occupants or owners or managers of houses, apartments, and other buildings own and use garden hoses to water lawns, plants, bushes and gardens, fill small pools and operate water toys, and wash furniture, walkways, driveways and automobiles, and for myriad other uses. Most buildings have only one or two outside spigots to which hoses can be attached. Use of these hoses can, and usually does, occur at all locations around the property which sites the building. Often, these hoses extend for 50, 75 or even 100 feet singly or in connected combination to enable watering or other use at all locations. This requires that the hose be deployed all over the property, including around the corner of the building, to a use location.

During deployment of the hose, it is desirable to keep the hose from being dragged through flower beds, bushes or vegetable gardens or through other obstacles. To this end, a variety of hose guides have been developed and commercialized. These hose guides are usually staked in the ground near the obstacle to route the hose around these obstacles. Such guides are usually of limited height and located within one foot of the ground, and some include a rotatable guide roller, as illustrated in U.S. Pat. No. 5,549,262. Great care must be taken to assure that the hose, usually being dragged by its distal end at a location 3–4 feet off the ground, does not slip out of or over these guides and enter the obstacle.

Other, more elaborate guides have been developed, such as shown in U.S. Pat. No. 5,853,142 in which a plurality of rotatable balls are confined in an inverted hook-shaped device to inhibit a hose from movement up and out of the guide. The rollers provide an antifriction bearing to facilitate hose movement and the guide may be mounted to a post or building. However, nothing keeps the hose from dragging on the ground, where the usual obstacles are found.

None of the prior art hose guides assures that a hose, while being dragged into a use position avoids contact with obstacles on the ground. All ground-mounted hose guides present an obstacle to foot traffic and can cause tripping and falls.

BRIEF SUMMARY OF THE INVENTION

Accordingly, it is an object of this invention to provide a hose guide that assures that a hose, while being deployed to a use position, avoids contact with obstacles on the ground.

It is a further object of this invention to provide a hose guide that eliminates the tripping hazard presented by currently-available hose guides.

In one aspect this invention features a preferably unitary plastic hose guide for guiding a hose mounted on a building above the ground so that a hose is lifted high enough to avoid contact with obstacles located on the ground adjacent a building while being deployed to a use location.

In another aspect, the hose guide of this invention features an elongated guide member has a J-shaped curved trough for retaining a hose placed in it. The trough has downwardly curved entrance and exit lips to facilitate hose movement into and out of the trough. The lip of the J-shape retains the hose in the trough by preventing the weight of the hose from pulling the hose outwardly and downwardly out of the trough, while readily permitting lifting of the hose out of the trough when desired. Preferably, a mounting bracket spaces the guide member from the building where it is removably secured by headed fasteners.

In yet another aspect, the mounting bracket includes a pair of legs spaced to embrace a downspout and space the guide member beyond the downspout.

In a further aspect, the hose guide of this invention features a unitary plastic guide having a semi-circular trough with a generally C-shaped cross section to direct the hose around a corner of the building. The hose is retained by one protrusion extending upwardly from the extended lower lip of the C-shape to retain the hose within the trough during hose movement. Preferably, headed fasteners on the building cooperate with keyhole-shaped slots to removably mount the hose guide on the corner of the building.

In a yet further aspect, this invention features a method of deploying and using water hose which prevents interference with ground obstructions adjacent a building while deploying and using the hose, comprising the steps of providing at least one hose guide mounted on the building above ground level, placing the hose in the guide, providing means for preventing accidental dislodgement of the hose from the at least one hose guide during deployment and use, and pulling the hose through the hose guide to deploy the hose.

These and other objects and features of this invention will become more readily apparent upon reference to the following detailed description of a preferred embodiment, as illustrated in the accompanying drawings, in which:

BRIEF DESCRIPTION OF THE DRAWINGS

FIG. 2 is a plan view of the hose guide of FIG. 1, illustrating attachment to a building;

FIG. 3 is a plan view of another embodiment of a hose guide according to this invention;

DETAILED DESCRIPTION OF THE INVENTION

Figure 1:
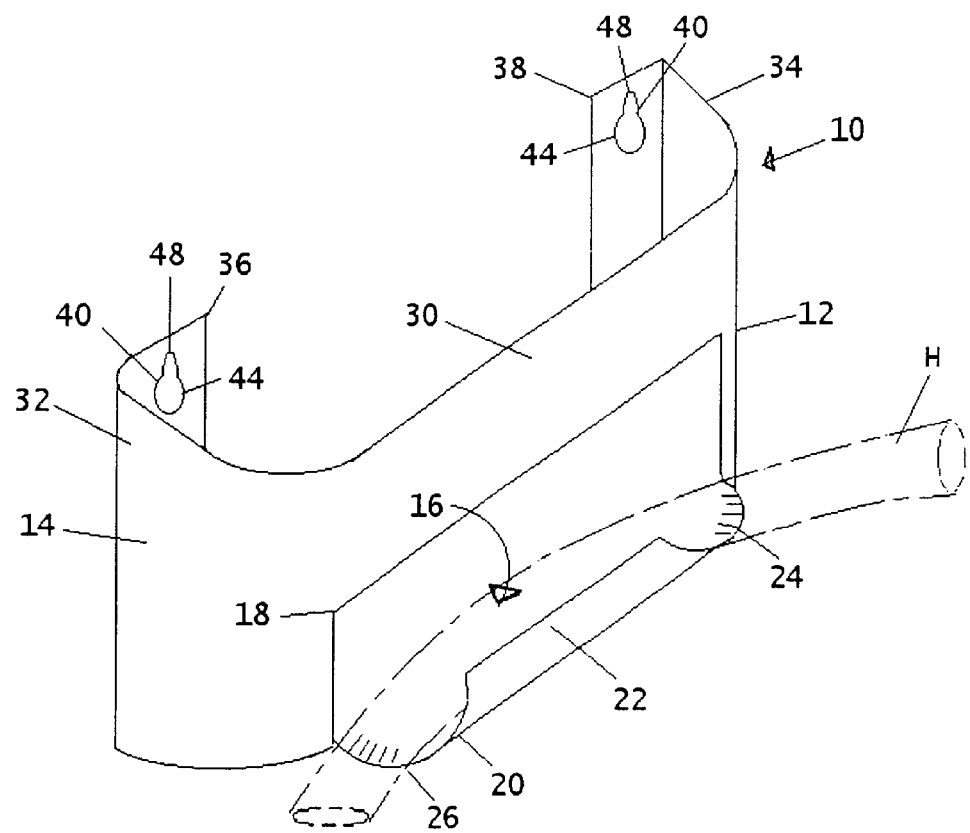
FIG. 1 is a perspective view of one embodiment of a hose guide according to this invention.
Figure 4:
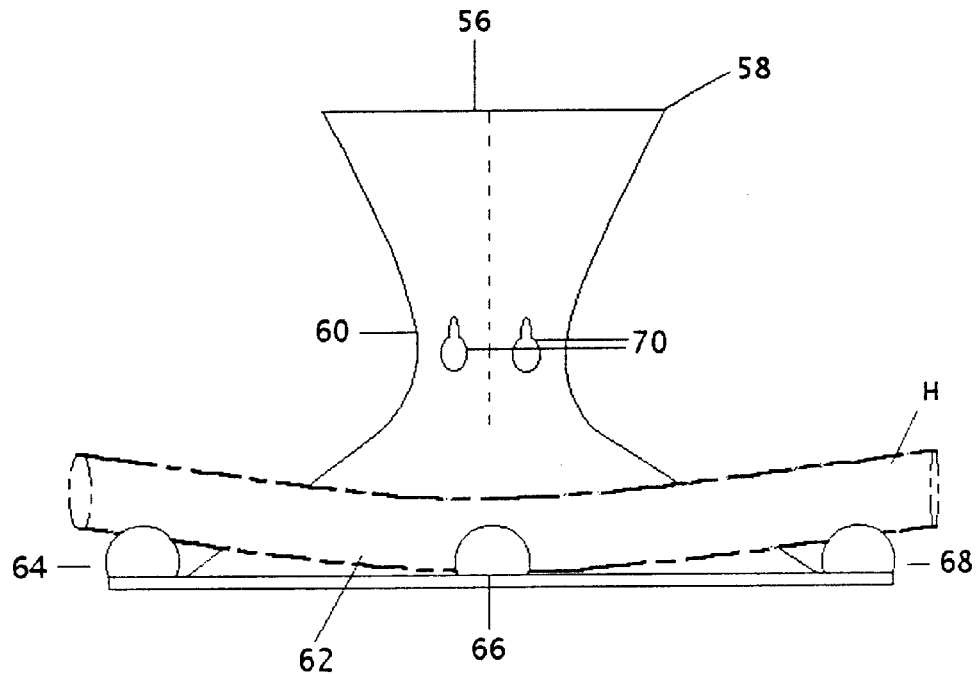
FIG. 4 is a front elevation of the hose guide of FIG. 3, illustrating attachment to a building.

Referring now to FIGS. 1 and 2, a hose guide 10 comprises a guide member 12 mounted on a mounting bracket 14. Hose guide 10 is preferably plastic and can be integral with or separate from mounting bracket 14, which, separately, may be an enameled metal component.

Guide member 12 is in the form of an elongated trough having a J-shaped cross-section. A hose pocket 16 is defined by the stem 18 of the ▓▓▓▓ pocket bottom 20, and upturned hook 22 of the "J". At the entrance/exit ends of pocket 16, lips 24 and 26 are curved downwardly and outwardly. A hose H, shown in phantom lines, when inserted into trough pocket 16 from above or either end, will be retained against removal during pulling of hose H through the pocket by upturned hook 22, as clearly shown in FIG. 1.

The entrance/exit lips 24 and 26 ease the entry end exit of hose H. The smooth plastic surface of pocket 16, in conjunction with the usually wet surface of hose H will provide sufficient lubrication for the passage of hose H through the pocket 16. Hose H will remain in hose guide 10 until purposefully removed by lifting during all pulling of hose H, no matter in which direction. This is due to the elevation of hose guide 10 above the ground, preferably 2–4 feet. This elevation is accomplished by the mounting of bracket 14, as will now be described.

Mounting bracket 14 has a C-shape, comprising a base 30 and a pair of extending, spaced legs 32 and 34 that are terminally flanged at 36 and 38. Flanges 36 and 38 each carry a keyhole-shaped aperture 40 which admits a fastener head 42 at its lower end 44, allowing lowering of the flanges 36 and 38 so that fastener shank 46 enters upper portion 48, trapping the flange beneath head 42. This allows hose guide to be removable when its use is no longer desired, such as in winter, by lifting hose guide 10 until the enlarged aperture lower ends 44 register with fastener heads 44, and removing it from the fasteners. Hose guide 10 can then be stores until needed, improving building aesthetics.

FIG. 2 shows hose guide 10 mounted near the corner of a building 50, embracing or flanking a rain downspout 52. This arrangement enables hose guide 10 to be mounted anywhere along the side of building 50. It is spaced from the building side to prevent hose contact with the siding surface, which could be brick, causing undue abrasion of the hose. It is essential that hose guide 10 be mounted a sufficient distance (e.g. 2–4 feet) above ground level so that hose H does not drop onto shrubbery, flowers or obstructions at the building side on the ground while being deployed or used.

As best seen in FIG. 3, another embodiment of hose guide 56 has a ¾ semi-circular hourglass shape with a C-shaped cross-section. Hose guide 56 comprises an outwardly flared upper portion 58 which transitions into a narrow waist portion 60 that transitions into an enlarged flared bottom portion 62, all of which are ¾ circular, as shown in FIG. 3. Bottom flared portion 62 mounts three spaced raised protrusions 64, 66 and 68. Hose guide is preferably a unitary plastic piece and includes a pair of spaced keyhole-shaped, parallel mounting holes 70.

Hose guide 56 is mounted on the corner 57 of house 50 by inserting headed fasteners through mounting holes 70 into building 50 so that the hose guide is temporarily trapped by fastener heads 42, but can be easily removed in the same manner as hose guide 10 described above. In use, hose H is placed on bottom flared portion 62 behind on or more of protrusions 64, 66 and 68. This confined hose H while it is being pulled through hose guide 56, either straight in direction "B", or around the corner 57 in direction "A". Upper flared portion 58 plays no part in preventing hose H from dropping out of the hose guide, but prevents any upward forces from causing hose H to ride up and touching house 50. This prevents possible abrasion of hose H by brick walls, and prevent possible damage of aluminum siding by hose H.

Figure 5:
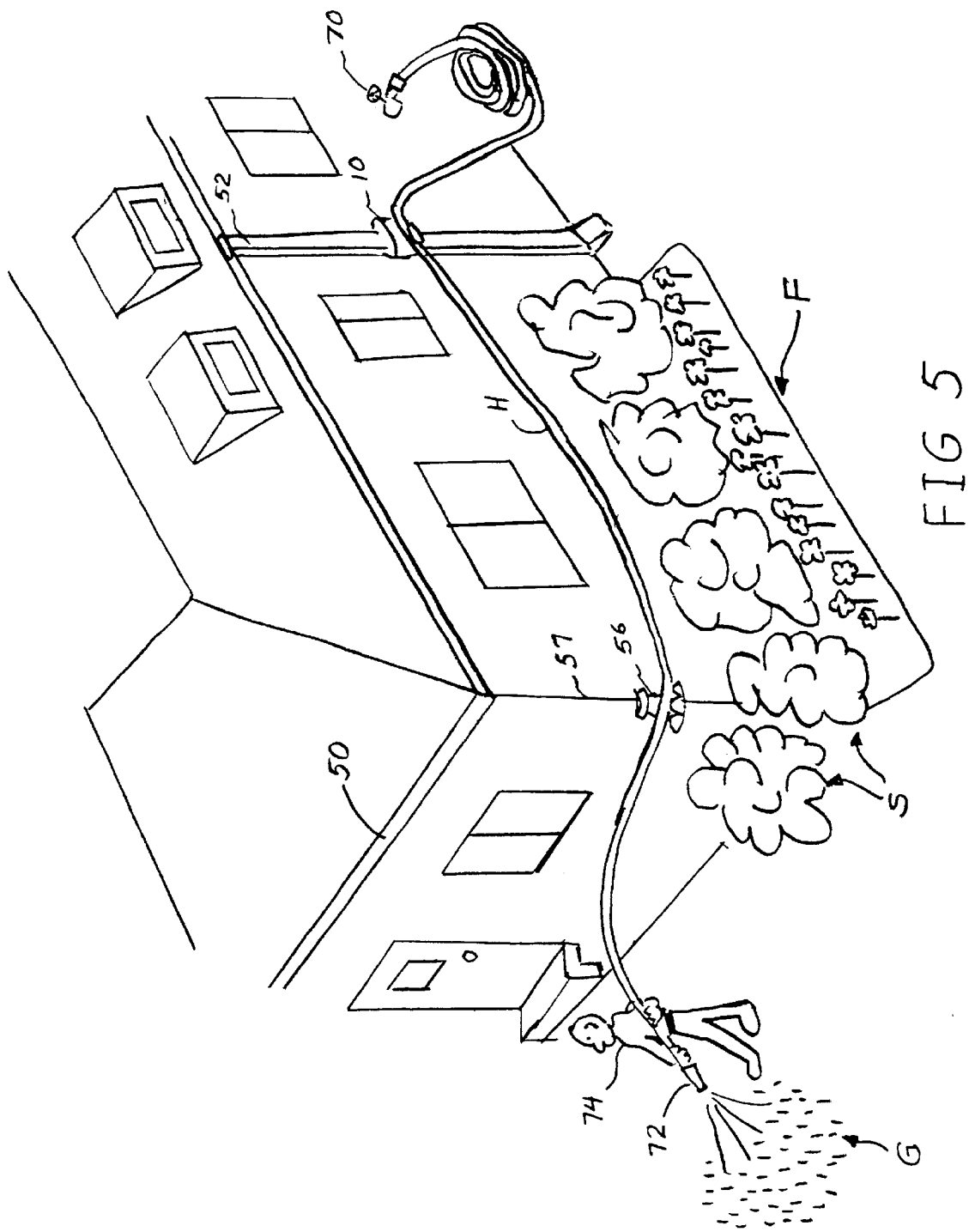
FIG. 5 is a perspective view of a building having hose guides according to this invention installed and illustrating their use in suspending a deployed hose above ground obstructions at the building base.

FIG. 5 illustrated use of hose guides 10 and 56, which are mounted on the sides of house 50. Shrubbery S and a flower garden F are planted at the base of the side of house 50. Hose H is attached at its proximal end to a water spigot or faucet 70 on house 50, and is trained through hose guide 10 flanking downspout 52 above shrubbery S. Hose H has been deployed through hose guide 56 mounted at the house corner 57, and pulled around the corner to a deployed position, where the attached hose nozzle 72 is illustrated as being used by an operator 74 to water an area of newly-seeded grass G.

Note that, in the exemplary FIG. 5 illustration, hose H has been easily deployed without any concern for disturbing flowerbed F or without being dragged through shrubbery S. This is possible because the hose has been deployed above, not around the ground obstacles. When hose operator 72 is finished with the watering task, hose H is merely pulled back through hose guides 56 and 10 and again coiled adjacent faucet 70 for further use. To improve aesthetics or to prepare for winter, both hose guides 10 and 56 can be easily removed, as described above.

One or many of the hose guides of this invention may be used to eliminate ground-mounted hose guides, which are impediments to foot traffic and can cause trips and falls, and eliminate the problem of dragging a hose through flowerbeds, shrubbery and the like. While only a preferred embodiment has been described and shown, obvious modifications are contemplated within the scope of this invention as defined by the following claims.

I claim:

1. A hose guide for guiding a hose, while being dragged to a use location, in a manner to avoid contact with obstacles located on the ground adjacent a building, comprising a guide member having a longitudinally linear and transversely curved trough for engaging a hose when introduced thereinto, curved entrance and exit lips formed on the longitudinal ends of the guide member to facilitate hose movement into and out of the trough, retention means on the guide member to retain the hose in the trough during movement of the hose through the trough by preventing the weight of the hose from dragging the hose laterally outwardly and downwardly out of the trough, while readily permitting movement of the hose through the trough and lifting of the hose out of the trough, and mounting means for mounting the guide member a distance spaced above the ground, thereby maintaining the hose above obstacles on the ground during and after movement of the hose through the trough.

2. The hose guide of claim 1, wherein the trough has a generally elongated J-shaped lateral cross-section and a straight longitudinal cross-section, with the retention means forming the upturned hook of the J-shape, and the curved entrance and exit lips are formed on the ends of the trough and each define a downward curve.

3. The hose guide of claim 2, wherein the mounting means comprises a bracket for spacing the guide member away from the building.

4. The hose guide of claim 3, wherein the mounting means is adapted for removable mounting on headed fasteners mounted on the building to enable removal of the hose guide when use is not desired.

5. The hose guide of claim 2, wherein the trough is made of a single piece of molded plastic.

6. The hose guide of claim 1, wherein the mounting means comprises a bracket having a pair of legs spaced sufficiently to embrace a building downspout to space the guide member a distance from the building beyond the downspout.

* * * * *